(12) United States Patent
Ito

(10) Patent No.: US 11,119,367 B2
(45) Date of Patent: Sep. 14, 2021

(54) LIQUID CRYSTAL DISPLAY DEVICE

(71) Applicant: Shanghai Tianma Micro-Electronics Co., Ltd., Shanghai (CN)

(72) Inventor: Hideki Ito, Kanagawa (JP)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 17/073,676

(22) Filed: Oct. 19, 2020

(65) Prior Publication Data

US 2021/0124222 A1    Apr. 29, 2021

(30) Foreign Application Priority Data

Oct. 23, 2019  (JP) .............................. JP2019-192917

(51) Int. Cl.
*G02F 1/1343*   (2006.01)
*G02F 1/1337*   (2006.01)
*G02F 1/1333*   (2006.01)
*G02F 1/133*    (2006.01)
*G02F 1/1335*   (2006.01)

(52) U.S. Cl.
CPC ...... *G02F 1/134327* (2013.01); *G02F 1/1337* (2013.01); *G02F 1/13306* (2013.01); *G02F 1/133345* (2013.01); *G02F 1/133514* (2013.01); *G02F 1/134363* (2013.01); *G02F 1/134372* (2021.01)

(58) Field of Classification Search
CPC ......... G02F 1/134363; G02F 1/134372; G02F 1/1337; G02F 1/133514
See application file for complete search history.

(56) References Cited

U.S. PATENT DOCUMENTS

2007/0236635 A1*  10/2007  Morimoto ......... G02F 1/134363
                                                    349/114
2008/0186440 A1    8/2008  Lim et al.
2016/0062197 A1    3/2016  Huang et al.

* cited by examiner

*Primary Examiner* — Jessica M Merlin
(74) *Attorney, Agent, or Firm* — Nixon & Vanderhye

(57) ABSTRACT

Pixel electrodes adjacent to each other along a first axis are supplied with pixel potentials having opposite polarities with respect to a potential of a common electrode. The pixel electrode includes straight parts. Electric fields between the straight parts and the common electrode are applied to negative type liquid crystal material. An electric field between the straight parts of the adjacent pixel electrodes is applied to the negative type liquid crystal material. An opposite substrate includes a second region opposed to a first region between the straight parts of the adjacent pixel electrodes. At least a part of visible light transmitted through the first region is transmitted through the second region. Angles of the straight parts with respect to an axis perpendicular to direction of initial alignment of the liquid crystal material have a size of not less than 15° and not more than 30°.

8 Claims, 14 Drawing Sheets

*COMPARATIVE EXAMPLE*

LIQUID CRYSTAL DISPLAY DEVICE

CROSS-REFERENCE TO RELATED APPLICATIONS

This non-provisional application claims priority under 35 U.S.C. § 119(a) on Patent Application No. 2019-192917 filed in Japan on Oct. 23, 2019, the entire content of which is hereby incorporated by reference.

BACKGROUND

This disclosure relates to a liquid crystal display device.

Liquid crystal display devices are applied to various fields from small-size mobile phones to large-size television monitors because of their characteristics to achieve low power consumption and high resolution. When a display device having a wide viewing angle is demanded, a horizontal (in-plane) electric field type of liquid crystal display device is employed. US 2016/0062197 A and US 2008/0186440 A disclose examples of the horizontal electric field type of liquid crystal display devices.

SUMMARY

An aspect of this disclosure is a liquid crystal display device including a liquid crystal panel and a driver circuit. The liquid crystal panel includes an element substrate, an opposite substrate, and a liquid crystal layer of a negative type of liquid crystal material sandwiched between the element substrate and the opposite substrate. The element substrate includes a first insulative substrate, an alignment film on the first insulative substrate, a common electrode on the first insulative substrate, a plurality of pixel electrodes between the common electrode and the alignment film on the first insulative substrate, and an interlayer insulating film between the plurality of pixel electrodes and the common electrode. The opposite substrate includes, a second insulative substrate, and color filters on the second insulative substrate, each of the color filters facing one of the plurality of pixel electrodes. The driver circuit is configured to supply pixel electrodes adjacent to each other along a first axis with pixel potentials having opposite polarities with respect to a potential of the common electrode. Each of the plurality of pixel electrodes includes a plurality of straight parts. Electric fields between the plurality of straight parts and the common electrode are applied to the negative type of liquid crystal material. An electric field between a straight part of one of the pixel electrodes adjacent to each other and a straight part of the other one of the pixel electrodes adjacent to each other is applied to the negative type of liquid crystal material. The opposite substrate includes a second region opposed to a first region between the straight parts of the pixel electrodes adjacent to each other. Light in at least a part of a wavelength range of visible light transmitted through the first region is transmitted through the second region. Angles of the plurality of straight parts of each of the plurality of pixel electrodes with respect to an axis perpendicular to direction of initial alignment of the liquid crystal layer defined by the alignment film have equal sizes. The angles have a size of not less than 15° and not more than 30°.

It is to be understood that both the foregoing general description and the following detailed description are exemplary and explanatory and are not restrictive of this disclosure.

EMBODIMENTS

Hereinafter, embodiments of this disclosure will be described with reference to the accompanying drawings. It should be noted that the embodiments are merely examples to implement the idea of this disclosure and not to limit the technical scope of this disclosure.

Embodiment 1

Configuration of Liquid Crystal Display Device

Figure 1:
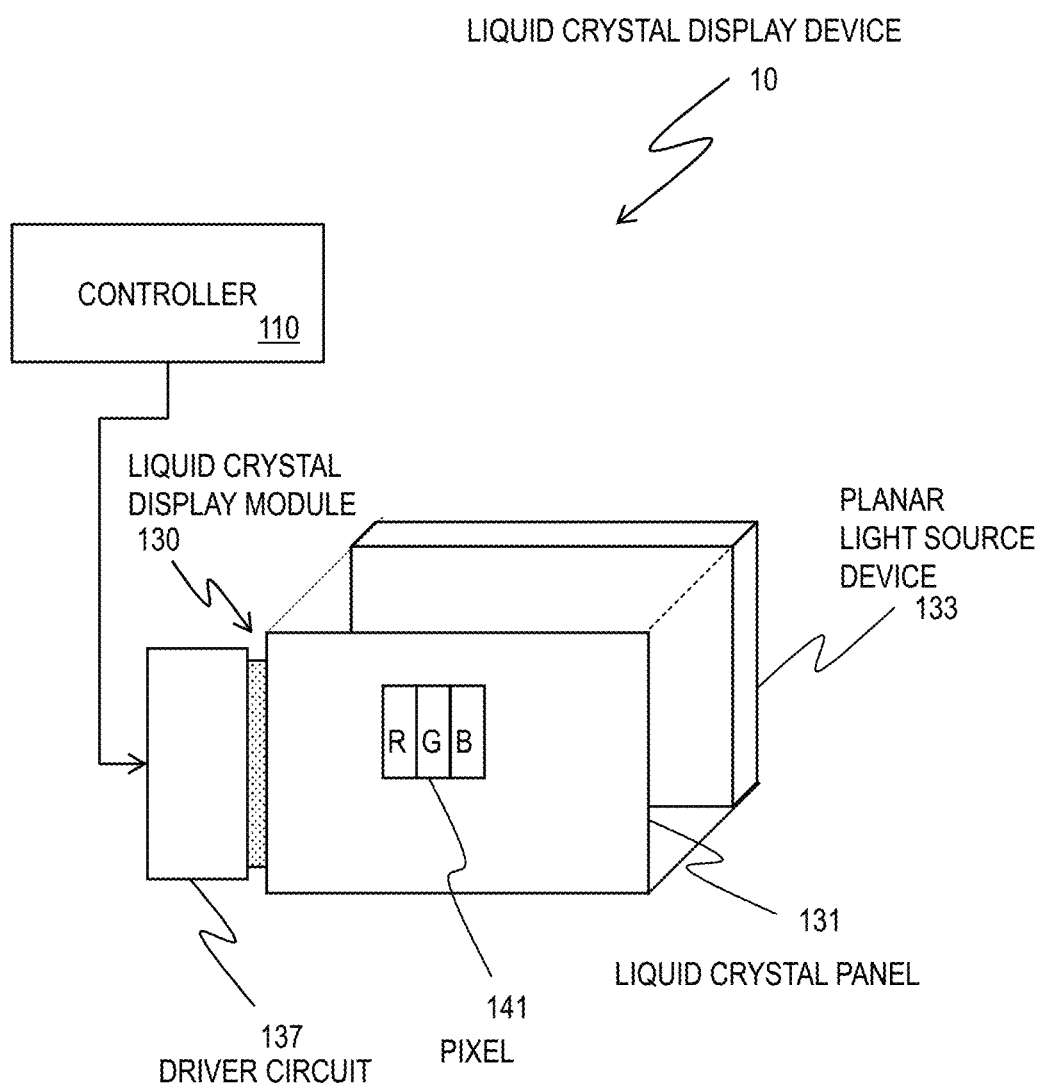
FIG. 1 schematically illustrates a configuration of a liquid crystal display device.

FIG. 1 schematically illustrates a liquid crystal display device in this embodiment. A liquid crystal display device 10 includes a liquid crystal display module 130 and a planar light source device 133. The liquid crystal display module 130 includes a liquid crystal panel 131, a driver circuit 137 for driving the liquid crystal panel, and a controller 110. In the configuration example in FIG. 1, the liquid crystal panel 131 is a color liquid crystal panel for color display. In the liquid crystal panel 131, a pixel 141 consists of three adjacent subpixels for three colors of red (R), green (G), and blue (B).

The controller 110 converts an image signal received from the external to generate a signal for making the liquid crystal display module 130 display an image. The controller 110 sends the generated signal to the driver circuit 137 for the liquid crystal panel 131. The driver circuit 137 drives the liquid crystal panel 131 in accordance with the signal received from the controller 110.

The planar light source device 133 illuminates the liquid crystal panel 131 from behind the liquid crystal panel 131. The liquid crystal panel 131 displays an image by controlling the amounts of light to be transmitted through individual subpixels based on the input driving signal. The observer views the displayed image produced by the light emitted from the planar light source device 133 and transmitted through the liquid crystal panel 131.

Figure 2:
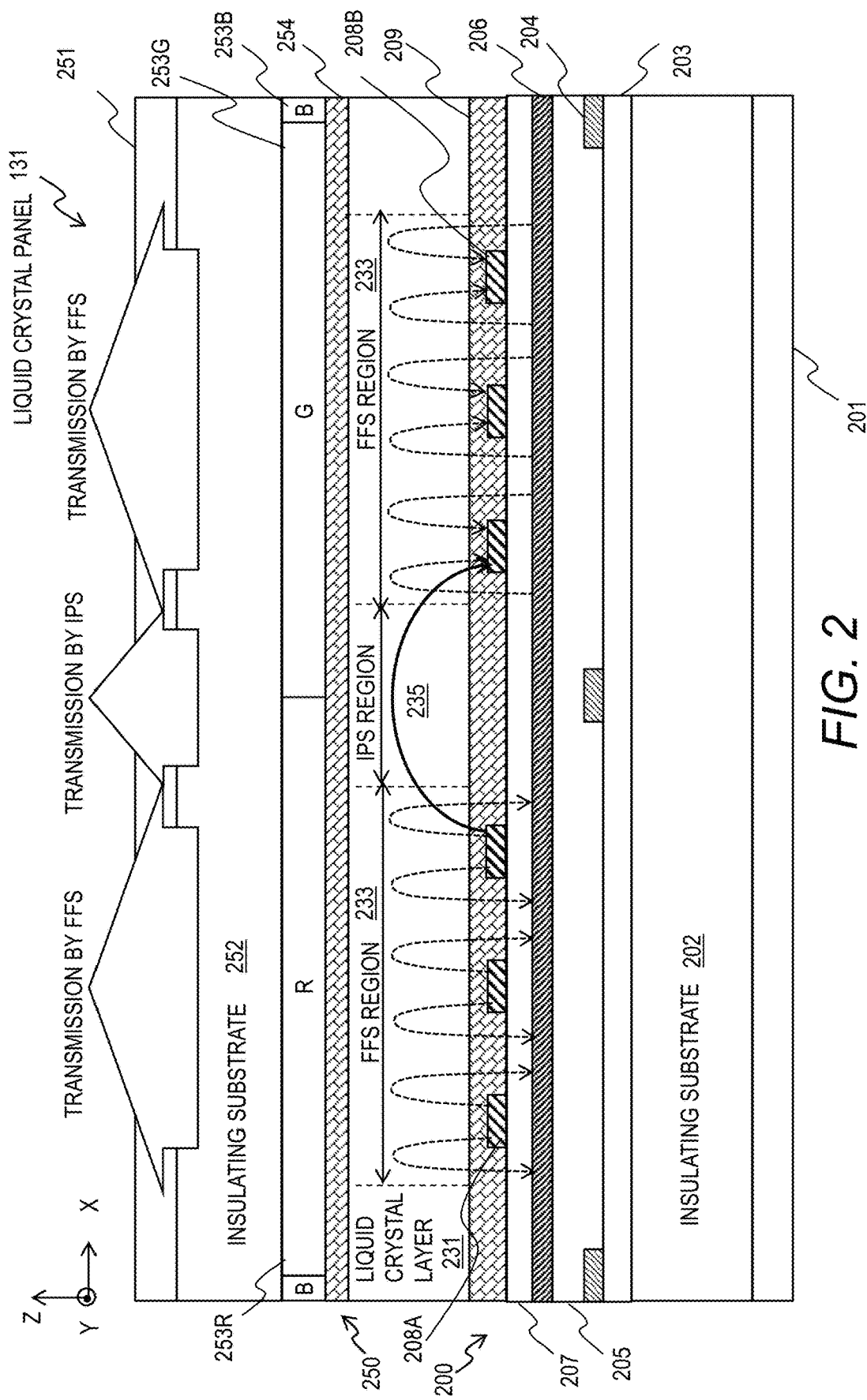
FIG. 2 illustrates an example of the cross-sectional structure of the display region of a liquid crystal panel.

FIG. 2 illustrates an example of the cross-sectional structure of the display region of the liquid crystal panel 131. The liquid crystal panel 131 includes a TFT substrate 200 and an opposite substrate 250 opposed to the TFT substrate 200. A liquid crystal layer (liquid crystal material) 231 is sandwiched between the TFT substrate 200 and the opposite substrate 250. The liquid crystal material is of the negative type. In FIG. 2, the TFT substrate 200, the liquid crystal layer 231, and the opposite substrate 250 are stacked along the Z-axis.

The TFT substrate 200 is an example of an element substrate and includes an insulating substrate 202. The insulating substrate 202 is an example of a first insulative substrate and it is an insulative transparent substrate made of glass or resin. An example of the insulating substrate 202 has a rectangular shape and one of the main faces is opposed to one of the main faces of the opposite substrate 250. A polarizing plate 201 is attached on the other main face of the insulating substrate 202 on the opposite side of the liquid crystal layer 231.

Although not shown in FIG. 2, a thin film transistor (TFT) array for selecting a subpixel to be controlled is fabricated on the main face of the insulating substrate 202 closer to the liquid crystal layer 231. FIG. 2 shows a gate insulating film 203 on the insulating substrate 202. The gate insulating film 203 can be a silicon nitride film or a silicon oxide film.

Data lines 204 are provided on the gate insulating film 203. In FIG. 2, one of the data lines is provided with a reference sign 204 by way of example. Each data line 204 transmits a signal (potential) to be supplied to a subpixel. In the configuration example in FIG. 2, the data lines 204 are made of a transparent conductor, such as colorless and transparent indium tin oxide (ITO). The data lines 204 can be made of an opaque conductor.

An insulative protection film 205 is provided to cover the data lines 204 (TFT array). The protection film 205 can be a silicon nitride film or a silicon oxide film. A common electrode 206 is provided on the protection film 205. In the configuration example in FIG. 2, the common electrode 206 is one sheet-like transparent electrode and can be made of transparent ITO.

An interlayer insulating film 207 is provided to cover the common electrode 206. The interlayer insulating film 207 can be a silicon nitride film or a silicon oxide film. Pixel electrodes are provided on the interlayer insulating film 207. FIG. 2 shows two pixel electrodes 208A and 208B by way of example. A pixel electrode is an electrode for controlling the amount of light to be transmitted through one subpixel assigned thereto. Each of the pixel electrodes 208A and 208B is a comb electrode; FIG. 2 shows a cross-section of the parts corresponding to the teeth of the pixel electrode. In the configuration example in FIG. 2, each of the pixel electrodes 208A and 208B has three teeth.

An alignment film 209 is provided to cover the pixel electrodes. The alignment film 209 is in contact with the liquid crystal layer 231 to define the orientation (initial alignment) of liquid crystal molecules under no electric field. The details of the initial alignment of the liquid crystal molecules will be described later.

The opposite substrate 250 in the configuration example in FIG. 2 is a color filter (CF) substrate including color filters. The opposite substrate 250 includes an insulating substrate 252 made of glass or resin. The insulating substrate 252 is an example of a second insulative substrate and can have a rectangular shape. A polarizing plate 251 is attached on the main face of the insulating substrate 252 on the opposite side of the liquid crystal layer 231.

Red, green, and blue color filters 253R, 253G, and 253B are provided on the other main face of the insulating substrate 252 closer to the liquid crystal layer 231. A red, green, or blue color filter is included in one subpixel. In the example of FIG. 2, the pixel electrode 208A on the left faces a red color filter 253R and the pixel electrode 208B on the right faces a green color filter 253G. Each color filter has transmissivity to light; it transmits light in a specific wavelength range (color) within the visible light range and absorbs light having the other wavelengths.

An alignment film 254 is laid on the color filters. The alignment film 254 is in contact with the liquid crystal layer 231 and defines the orientation (initial alignment) of the liquid crystal molecules when no electric field is applied. In the example described in the following, the direction of alignment of the alignment film 254 of the opposite substrate 250 is parallel to the direction of alignment of the alignment film 209 of the TFT substrate 200. The polarization axis of the polarizing plate 251 of the opposite substrate 250 is perpendicular to the polarization axis of the polarizing plate 201 of the TFT substrate 200. The direction of alignment is parallel to either the polarization axis of the polarization plate 201 of the TFT substrate 200 or the polarization axis of the polarization plate 251 of the opposite substrate 250.

In the configuration example of FIG. 2, the opposite substrate 250 is the front of the liquid crystal panel 131 to face the observer and the TFT substrate 200 is the back. Accordingly, the planar light source device 133 is disposed to face the TFT substrate 200 of the liquid crystal panel 131 in FIG. 2. In another example, the TFT substrate 200 can be the front and the opposite substrate 250 can be the back.

The liquid crystal display module 130 operates the liquid crystal panel 131 configured as illustrated in FIG. 2 in a dot inversion mode or a V-line inversion mode (also called column inversion mode). In the dot inversion mode, the liquid crystal display module 130 supplies subpixels that are adjacent to each other along a gate line (the X-axis/a horizontal line) with pixel potentials having opposite polarities with respect to the potential of the common electrode 206 and also, supplies subpixels that are adjacent to each other along a data line (the Y-axis/a vertical line) with pixel potentials having opposite polarities with respect to the potential of the common electrode 206. The X-axis (an example of a first axis), the Y-axis, and the Z-axis are orthogonal to one another.

In the V-line inversion mode, the liquid crystal display module 130 supplies subpixels that are adjacent to each other along a gate line (the X-axis) with pixel potentials having opposite polarities with respect to the potential of the common electrode 206 and supplies subpixels that are adjacent to each other along a data line (the Y-axis) with pixel potentials having the same polarity.

In other words, the liquid crystal display module 130 supplies subpixels that are connected with the same gate line and connected with two adjacent data lines with pixel potentials having opposite polarities with respect to the potential of the common electrode 206. In the configuration example in FIG. 2, the liquid crystal display module 130 supplies the pixel electrodes 208A and 208B with pixel potentials having opposite polarities with respect to the potential of the common electrode 206. The polarities of the potentials to be supplied to the pixel electrodes are alternated frame by frame.

As illustrated in FIG. 2, the pixel electrodes 208A and 208B are in a layer different from the layer of the common electrode 206 (the pixel electrodes 208A and 208B are provided on an insulating layer different from the insulating layer on which the common electrode 206 is provided); fringe electric fields are generated between the pixel electrode 208A and the common electrode 206 and between the pixel electrode 208B and the common electrode 206. A region in the liquid crystal layer 231 that is mostly driven by a fringe electric field is referred to as fringe-field switching (FFS) region 233.

Since the pixel electrodes 208A and 208B provided on the same layer are supplied with pixel potentials of opposite polarities, a horizontal electric field is further generated between the pixel electrodes 208A and 208B. The line of electric force is directed from one pixel electrode to the other. A region in the liquid crystal layer 231 that is mostly driven by the electric field between pixel electrodes is referred to as in-plane switching (IPS) region 235. Referring to the region (gap) between two adjacent pixel electrodes 208A and 208B on the TFT substrate 200 as first region and the region of the opposite substrate 250 opposed to the first region as second region, the region of the liquid crystal layer 231 sandwiched by the first region and the second region includes an IPS region 235 and the FFS regions 233 (parts thereof) on both sides of the IPS region 235.

The liquid crystal display module 130 selects individual subpixels with the TFTs associated therewith and controls the potentials of their pixel electrodes. The liquid crystal display module 130 controls the potentials of the pixel electrodes of individual subpixels in accordance with image data to control the amounts of light to be transmitted through the subpixels. The liquid crystal display module 130 controls the amount of light to be transmitted through a subpixel (the brightness of the subpixel) by the fringe electric field between its pixel electrode and the common electrode 206.

The brightness of a subpixel is determined by the sum of the light transmitted through the FFS region 233 driven by the associated pixel electrode and the light transmitted through a part of each IPS region 235 between the associated pixel electrode and the pixel electrode adjacent thereto on either side. The potential of the common electrode 206 can be constant or changed frame by frame.

In the configuration example in FIG. 2, the ends of the color filters adjacent along the X-axis are in contact with each other and a black matrix (BM) to block light is not provided therebetween. For example, a color filter 253R and a color filter 253G are in contact with each other and has an interface therebetween. The same applies to the pair of a color filter 253B and a color filter 253R and the pair of a color filter 253B and a color filter 253G.

The light transmitted through the IPS region 235 is not intercepted by a black matrix and partial light in specific wavelength ranges is transmitted through the color filter 253R and the color filter 253G. In the configuration example in FIG. 2, a data line 204 is provided between the pixel electrodes 208A and 208B and extends through the IPS region 235 when viewed planarly (along the Z-axis). However, the reduction in brightness of the light transmitted through the IPS region 235 is small because the data line 204 is transparent. Elimination of a black matrix or employment of transparent data lines contributes to reduction in the amount of light absorbed in the liquid crystal panel and prevents the internal temperature of the liquid crystal panel from rising.

In the liquid crystal display panel 131, there is no black matrix between subpixels (pixel electrodes) adjacent to each other along the X-axis, as described above. The black matrix does not need to be provided between subpixels (pixel electrodes) adjacent to each other along the Y-axis, either; however, it is preferable to be provided there.

To prevent a fringe electric field between a pixel electrode and the common electrode 206 from entering adjacent subpixels, a sufficient distance is necessary between pixel electrodes adjacent to each other. The intensity of the electric field between two adjacent pixel electrodes decreases with increase in distance between the adjacent pixel electrodes. Accordingly, to appropriately drive the liquid crystal molecules in an IPS region 235 with the electric field between two adjacent pixel electrodes, it is important to supply a pixel potential having a large absolute value to each of the two pixel electrodes.

On the other hand, the pixel potential for an FFS region 233 supplied with a fringe electric field to attain a desired transmittance depends on the degree (angle) of rotation of the liquid crystal molecules around the pixel electrode from the initial aligned state. When the rotation is larger, the bulk liquid crystal in the middle of the liquid crystal layer 231 easily rotate; the desired transmittance is attained with pixel potential having a smaller absolute value.

However, when the pixel potential (the absolute value thereof) is small (the driving voltage for a subpixel is small) as described above, the IPS region 235 may not be supplied with an electric field having sufficient intensity. Accordingly, to attain appropriate transmittance in both the FFS region 233 and the IPS region 235, it is important that the initial liquid crystal layer 231 be aligned appropriately.

Figure 3A:
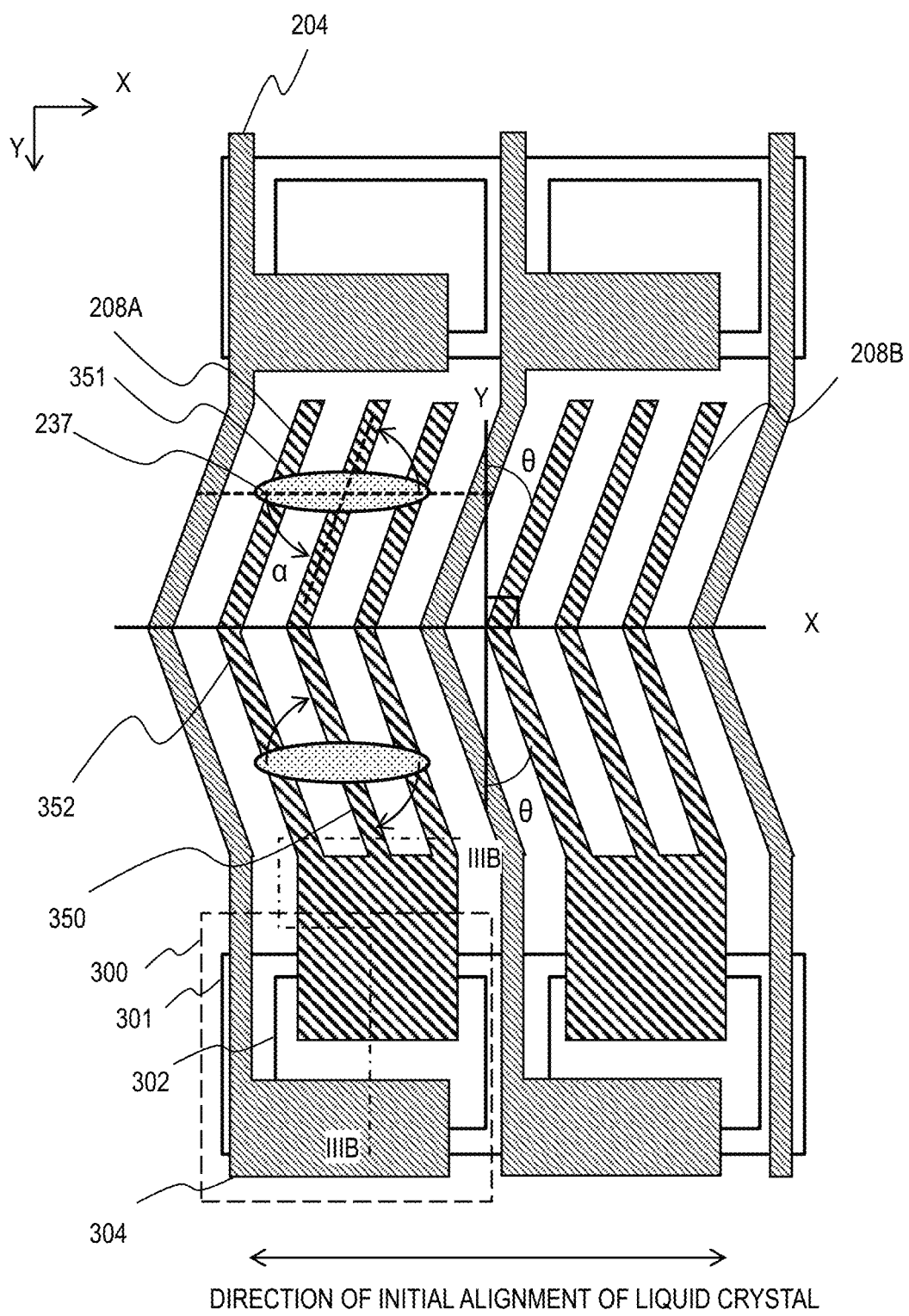
FIG. 3A schematically illustrates a relation between a pixel electrode and the initial aligned state of a liquid crystal layer.

FIG. 3A schematically illustrates a relation between a pixel electrode and the initial aligned state of the liquid crystal layer 231. Pixel electrodes have a shape common to all subpixels. FIG. 3A includes pixel electrodes 208A and 208B adjacent to each other along the X-axis. Each of the pixel electrodes 208A and 208B is connected with a TFT 300. In FIG. 3A, the TFT for selecting the pixel electrode 208A is provided with a reference sign 300 by way of example. The TFT 300 is connected with a data line 204 through a connector 304. The connector 304 is included in the same metal layer as the data line 204 and is continued to the data line 204.

Figure 3B:
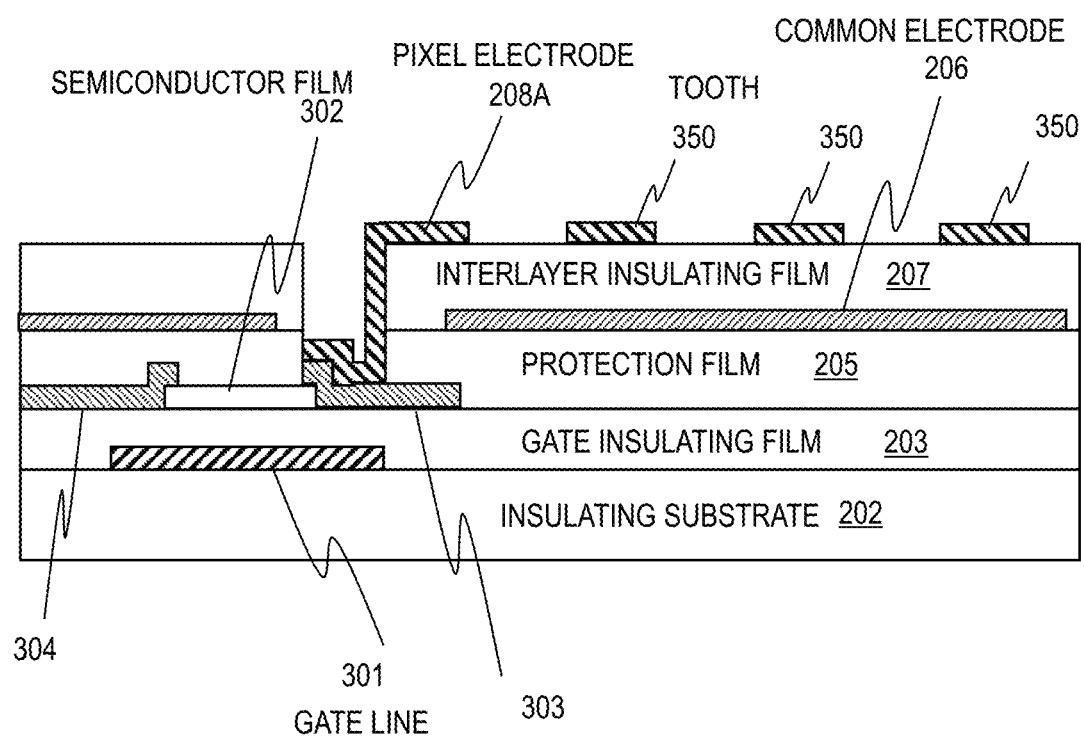
FIG. 3B schematically illustrates the cross-sectional structure along the section line IIIB-IIIB in FIG. 3A.

FIG. 3B schematically illustrates the cross-sectional structure along the section line IIIB-IIIB in FIG. 3A. A gate line 301 is provided on the main face of the insulating substrate 202. The gate line 301 has a single layer or multi-layer structure of metals such as Al, Mo, and Cr or an alloy thereof.

A gate insulating film 203 is provided to cover the gate line 301. A semiconductor film 302 included in the TFT 300 is provided above the gate insulating film 203 to overlap the gate line 301 when viewed planarly (along the Z-axis). The connector 304 to the data line 204 is in contact with the semiconductor film 302. Further, an interconnector 303 included in the same metal layer as the data line 204 and the connector 304 is provided above and in contact with the semiconductor film 302.

A protection film 205 and an interlayer insulating film 207 are provided to cover the data line 204. A common electrode 206 is provided above the protection film 205. The interlayer insulating film 207 is provided to cover the common electrode 206. A via hole is formed in the protection film 205 and the interlayer insulating film 207 to expose the interconnector 303. The pixel electrode 208A is in contact with the interconnector 303 though a via inside the via hole.

Returning to FIG. 3A, the pixel electrode 208A has a comb-like shape and includes three teeth 350. In FIG. 3A, the middle tooth is provided with a reference sign 350 by way of example. The teeth 350 extend along the Y-axis and bend. The three teeth 350 have the identical shapes and disposed side by side along the X-axis.

Each tooth 350 consists of two straight parts 351 and 352. The angle between the straight part 351 and the Y-axis has an equal size θ to the angle between the straight part 352 and the Y-axis. In the following, the size θ of these angles is also referred to as angle of bend. The straight parts 351 and 352 are oblique to the Y-axis in the opposite directions. The direction of the initial alignment of the liquid crystal layer 231 is parallel to the X-axis; the longitudinal axes of liquid crystal molecules 237 are parallel to the X-axis. Each tooth can consist of three or more straight parts or otherwise, one straight part. In any configuration, the angles of the individual straight parts with respect to the Y-axis have the same size.

The data line 204 extends along the Y-axis, bends along the teeth of the pixel electrode, and is distant from the teeth when viewed planarly. The data line 204 can extend straight along the Y-axis without a bend; the distance to the teeth can be different depending on the position when viewed planarly.

The liquid crystal molecules 237 are of the negative type. When a pixel potential for the highest gray level is supplied to the pixel electrode, the longitudinal axes of liquid crystal molecules 237 close to the TFT substrate 200 become substantially parallel to the straight parts. The angle of rotation a of a liquid crystal molecule 237 in the proximity of the TFT substrate 200 is equal to the angle between the direction of initial alignment of the liquid crystal molecule 237 (the direction along the X-axis) and a straight part. Accordingly, the angle of rotation a is larger when the angle of bend θ is smaller. Specifically, the values α and θ have the following relation:

$$\alpha = 90° - \theta.$$

As described above, when the angle of rotation α of a liquid crystal molecule 237 is larger, an FFS region 233 can have desired transmittance with smaller driving voltage (the potential difference between the pixel potential and the common potential). In other words, when the angle of bend θ is larger, higher driving voltage is required to attain desired transmittance.

Figure 4:
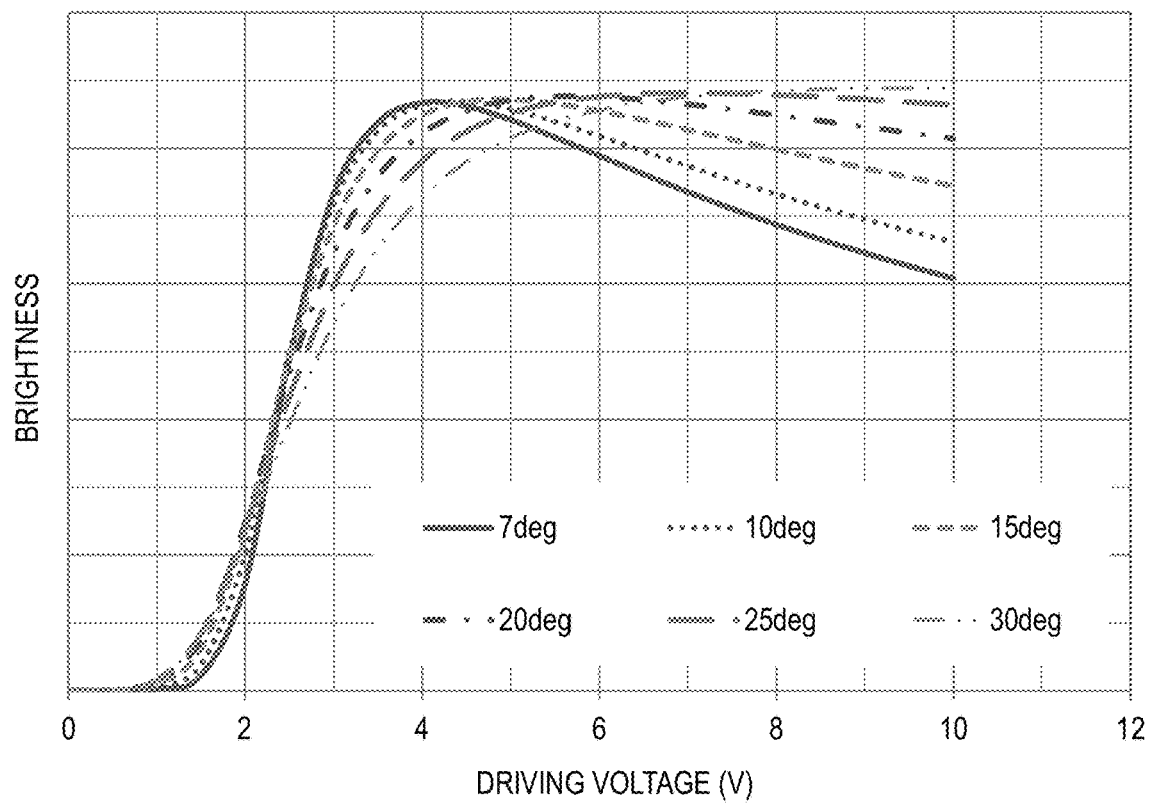
FIG. 4 provides examples of simulation results about the relation between the driving voltage and the brightness of the light transmitted through an FFS region in liquid crystal display panels different in the angle of bend θ.

FIG. 4 provides examples of simulation results about the relation between the driving voltage and the brightness of the light transmitted through an FFS region 233 in liquid crystal panels different in the angle of bend θ. As described above, when the angle of bend θ is larger, the driving voltage (peak voltage) to attain peak brightness is higher.

When the driving voltage for a subpixel is low, the voltage between pixel electrodes adjacent to each other is also low, so that the transmittance of the IPS region 235 becomes low. Accordingly, for the IPS region 235 to attain desired transmittance, it is important to define the initial alignment of the liquid crystal layer 231 appropriately.

Figure 5:
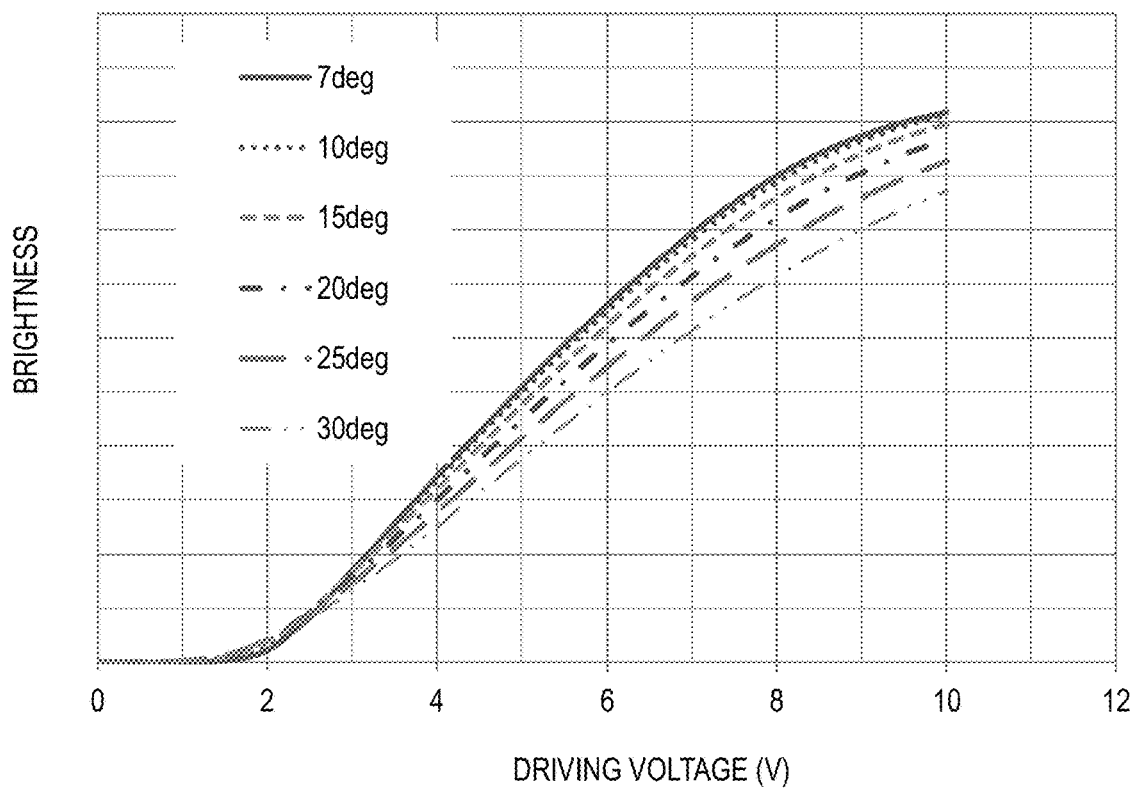
FIG. 5 provides examples of simulation results about the relation between the driving voltage and the brightness of the light transmitted through an IPS region in liquid crystal display panels different in the angle of bend θ.
Figure 6:
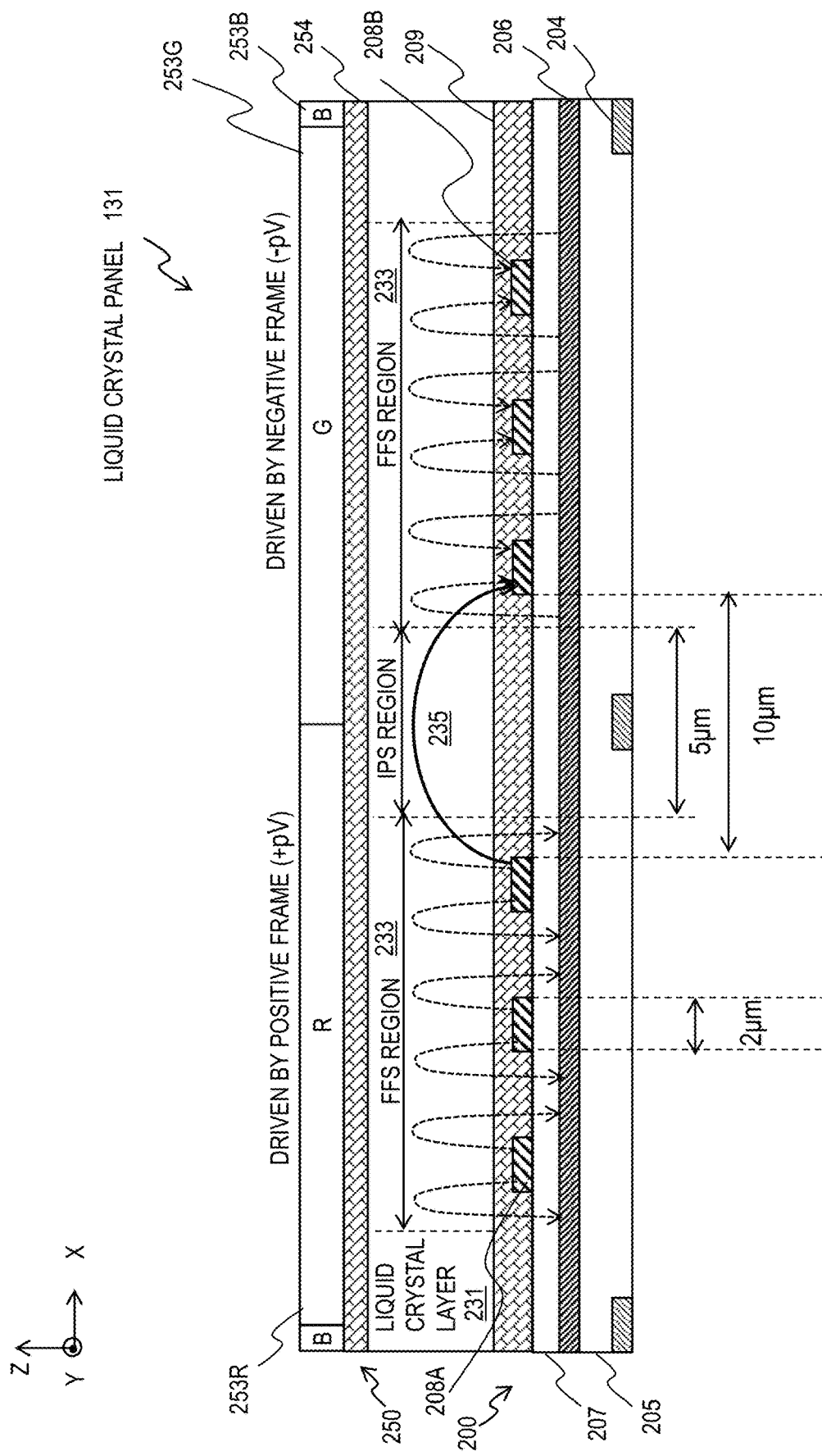
FIG. 6 illustrates a liquid crystal display panel used in the simulations.

FIG. 5 provides examples of simulation results about the relation between the driving voltage and the brightness of the light transmitted through an IPS region 235 in liquid crystal panels different in the angle of bend θ. FIG. 6 illustrates a liquid crystal display panel used in the simulations. The width of a tooth is 2 µm, the gap (the width of a first region) d between two pixel electrodes 208A and 208B is 10 µm. The width of an IPS region 235 is assumed to be 5 µm. Usually, the gap d between pixel electrodes needs to be approximately 10 µm to prevent a fringe electric field between a pixel electrode and the common electrode from affecting the next subpixel. Regarding the other parameters, conditions of a common liquid crystal panel were applied.

Driving the liquid crystal in an IPS region 235 utilizes the potential difference between the pixel electrodes 208A and 208B for two adjacent subpixels. Accordingly, the effective voltage across the IPS region 235 is the value twice as high as the driving voltage indicated in the graph. As understood from the graph in FIG. 5, the brightness increases with driving voltage in the cases of any angle of bend θ, although the brightness differs depending on the difference in the angle of bend θ.

As understood from the simulation results in FIGS. 4 and 5, when the angle of bend θ is too small, the pixel potentials supplied to the pixel electrodes become too small to apply an electric field having a sufficient intensity to the IPS region 235, so that the brightness (transmittance) of the IPS region 235 becomes low. On the other hand, when a high driving voltage (a driving voltage higher than the peak voltage) is supplied to subpixels in order to raise the brightness of the IPS region 235, the brightness of the FFS regions 233 falls.

The inventors conducted various simulations to research an appropriate range for the angle of bend θ. As a result, the inventors found that the preferable angle of bend θ is not less than 15° and not more than 30°. Hereinafter, examples of the simulations are described.

In an FFS region 223, the angle of rotation a of liquid crystal molecules in the proximity of a pixel electrode driven at the white voltage for the highest gray level can be made smaller by increasing the angle of bend θ. For example, when θ=25°, α=90°−θ=65°. Since the angle of rotation a of the liquid crystal molecules in the proximity of the pixel electrode is small, a high electric field (driving voltage) is necessary to rotate the bulk liquid crystal. The high driving voltage increases the voltage between adjacent pixel electrodes to attain higher brightness in the IPS region 235.

Figure 7:
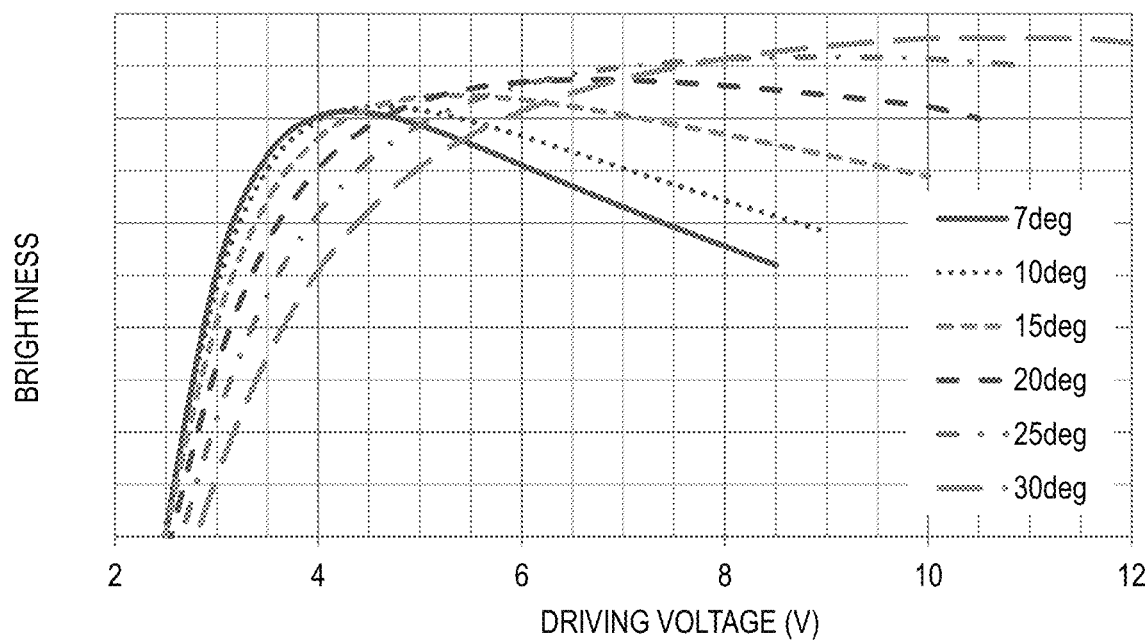
FIG. 7 provides examples of simulation results about the relation between the driving voltage and the brightness of the light transmitted through a subpixel in liquid crystal display panels different in the angle of bend θ.

FIG. 7 provides examples of simulation results about the relation between the driving voltage and the brightness of the light transmitted through a subpixel in liquid crystal panels different in the angle of bend θ. The light transmitted through a subpixel can be expressed by the sum of the light transmitted through an FFS region 233 and the light transmitted through an IPS region 235. In the liquid crystal panels used in the simulations, the distance d between two pixel electrodes 208A and 208B is 10 µm. It is assumed that the width of the IPS region 235 is 5 µm and the width of the FFS region 233 is 19 µm. Regarding the other parameters, conditions of a common liquid crystal panel were applied. The effective voltage across the IPS region 235 is twice as high as the driving voltage shown in the graph.

Figure 8:
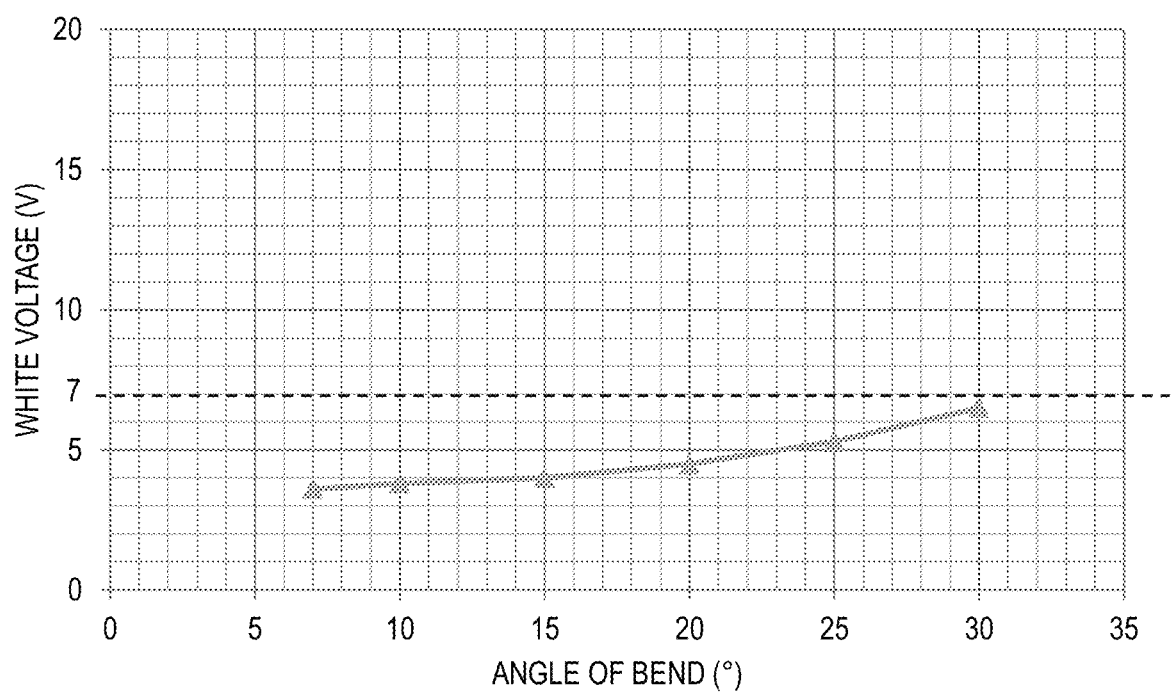
FIG. 8 illustrates a relation between the angle of bend θ and the white voltage in simulations under the same conditions as the simulations in FIG. 7.

FIG. 8 illustrates a relation between the angle of bend θ and the white voltage in simulations under the same conditions as the simulations in FIG. 7. The white voltage is the driving voltage for a pixel consisting of subpixels of three colors to display white and corresponds to the driving voltage for the highest gray level. The graph in FIG. 8 represents the relation between the angle of bend θ and the white voltage when the brightness for displaying white is 95% of the peak brightness of each subpixel.

As understood from the graph in FIG. 7, the peak brightness of a subpixel increases as the angle of bend θ increases. Meanwhile, the graph in FIG. 8 indicates that the white voltage increases as the angle of bend θ increases. It is preferable that the white voltage be not more than 7 V in view of the restrictions of the driver circuit 137 and power consumption.

In general, a liquid crystal display device does not employ the voltage for the peak brightness as white voltage. One of the reasons is that the white voltage is determined to be a voltage higher than the voltage for the peak brightness if the brightness—voltage characteristic curve shifts to lower voltage because of the variation of process, for example. This condition could cause so-called grayscale inversion.

Accordingly, the white voltage is usually determined to be a voltage for the brightness lower than the peak brightness by a few percent to five percent so that grayscale inversion will not occur even if the brightness—voltage characteristic curve shifts to lower voltage. As indicated in the graph of FIG. 8, when the angle of bend θ is 30°, the white voltage for displaying white at 95% of the peak brightness is 6.5 V, which is lower than 7 V. Accordingly, the upper limit for the angle of bend θ can be determined to be 30° in order to display white appropriately. The brightness of 95% is sufficiently acceptable to secure a margin to avoid grayscale inversion.

Figure 9:
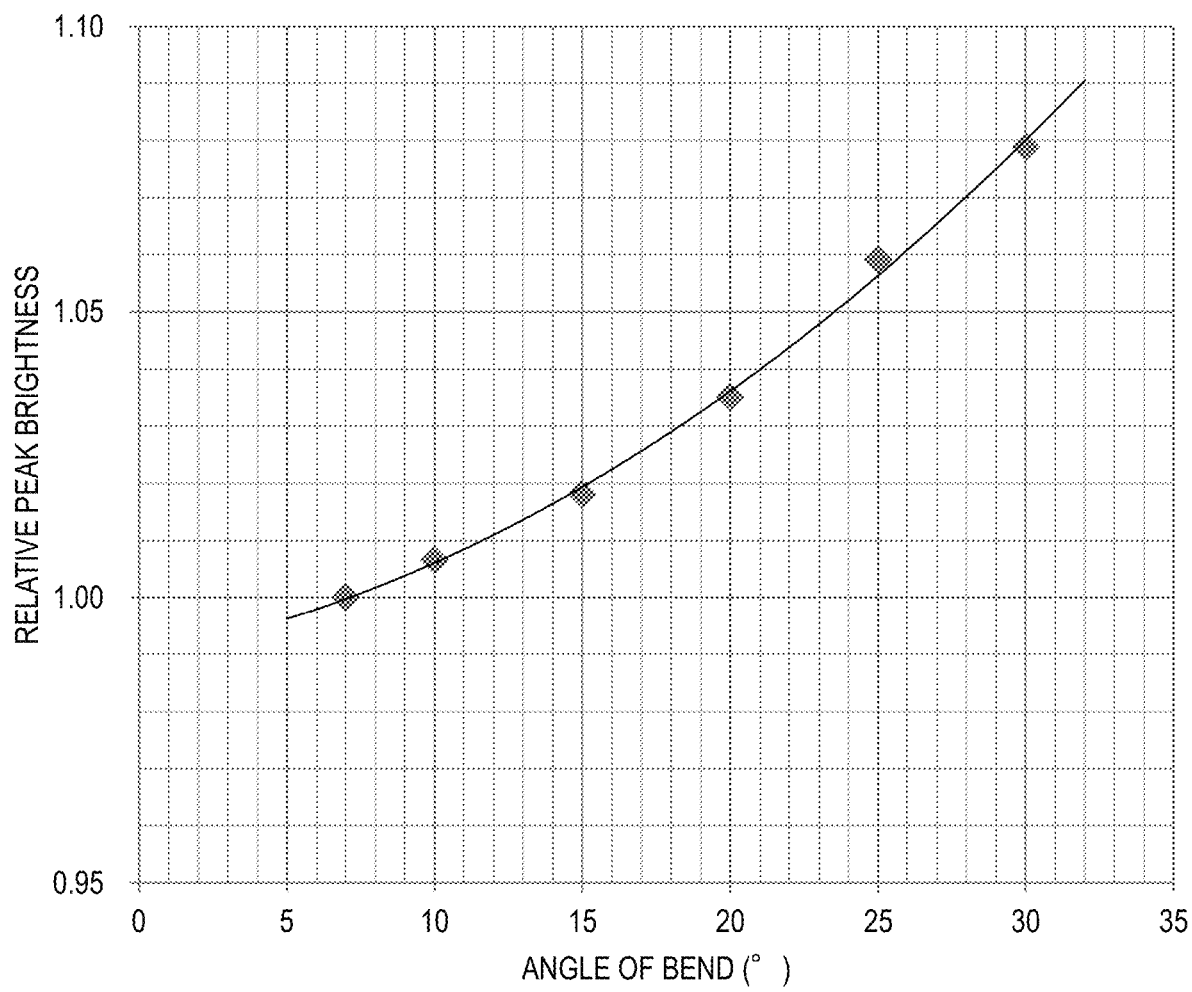
FIG. 9 illustrates the relation between the bending angle θ and the relative peak brightness extracted from the graph of FIG. 7.

FIG. 9 illustrates a relation between the angle of bend θ and the relative peak brightness extracted from the graph of FIG. 7. The graph of FIG. 9 indicates that the peak brightness increases as the angle of bend θ increases. The common angle of bend θ is approximately 5° to 7°. Compared to the peak brightness in the case of 5°, the brightness improved by approximately 1% when the angle of bend θ was 10°. When the angle of bend θ was 15°, greater effect of increase of more than a few percent was obtained. Furthermore, when the angle of bend θ was 22°, still greater effect of increase of more than 5% was obtained.

Figure 10:
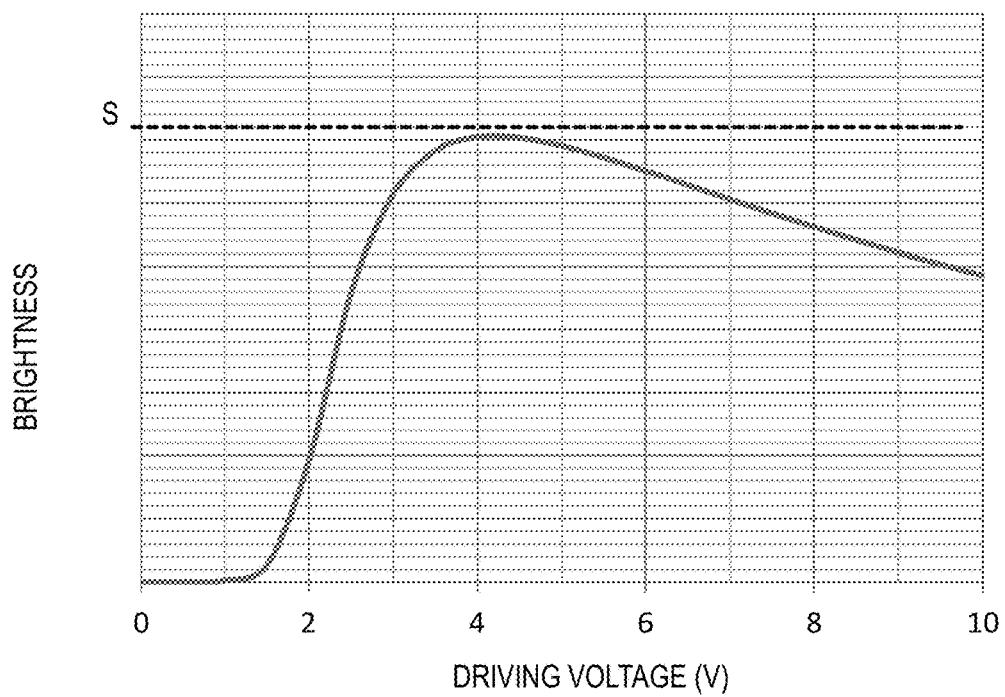
FIG. 10 provides a simulation result of a common FFS type of liquid crystal display panel in which a black matrix having a line width of 5 μm is provided to cover data lines when viewed planarly.

FIG. 10 provides a simulation result of a common FFS type of liquid crystal display panel in which a black matrix having a line width of 5 µm is provided to cover data lines 204 when viewed planarly. The angle of bend θ in the simulation is 7° and the white voltage is 4 V. The brightness under the driving voltage of 4 V is S.

Figure 11:
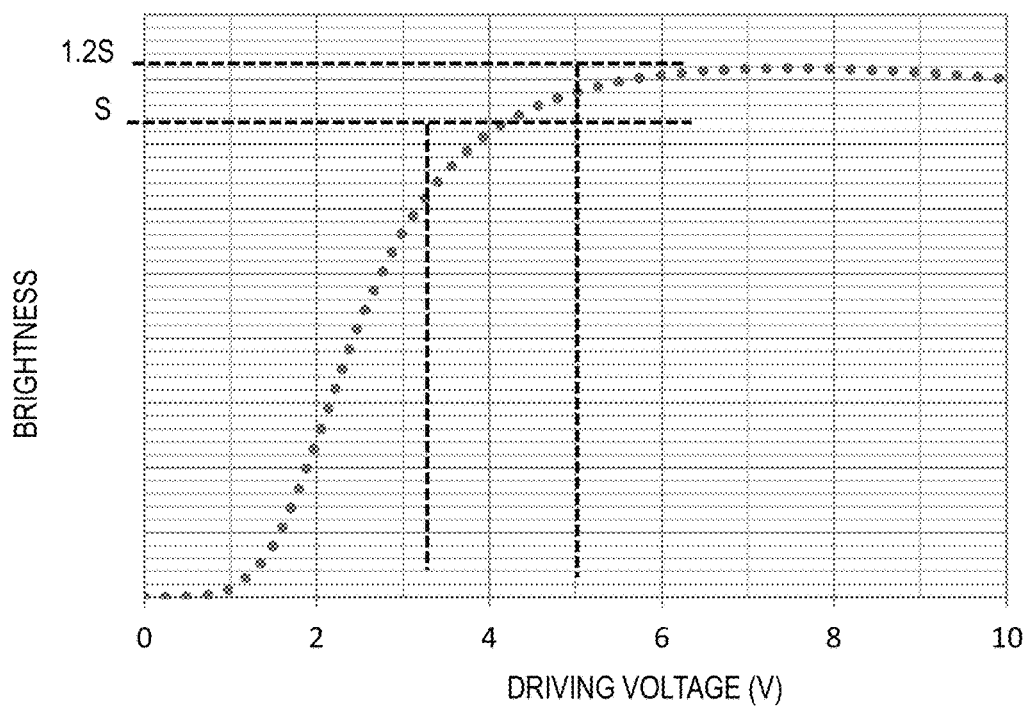
FIG. 11 provides a simulation result of a liquid crystal display panel in which a black matrix covering data lines is not included as illustrated in FIG. 6, the angle of bend θ is 20°, and transparent data lines are employed.

FIG. 11 provides a simulation result of a liquid crystal display panel in which the black matrix covering data lines 204 is not included as illustrated in FIG. 6, the angle of bend θ is 20°, and transparent data lines 204 are employed. The driving voltage to attain the brightness S is approximately 4 V and the brightness can be increased to 1.2 S by increasing the driving voltage to 6 V.

As described above, a liquid crystal display module in which initial alignment is defined appropriately attains higher peak brightness than conventional liquid crystal display panels. For this reason, the controller 100 can change the driving voltage (the pixel potential) for displaying white in accordance with mode settings. In a normal mode, the controller 100 displays white at a gray level lower than the highest level (with an example of a normal pixel potential). In response to the user's selection or the ambient brightness, for example, the controller 100 enters a high-brightness mode; the controller 100 changes the gray level for displaying white to the highest level and supplies a higher driving voltage (pixel potential higher than the normal pixel potential). The controller 100 can change the relations between gray levels and pixel potentials in accordance with the selected mode.

As described above, this embodiment attains higher transmittance of a liquid crystal display module. Exclusion of a black matrix produces a concern about color mixture of light between adjacent subpixels. However, in the simulations, chromatic change caused by color mixture of light in adjacent subpixels was not substantially perceived, when viewed from the front.

Embodiment 2

Figure 12:
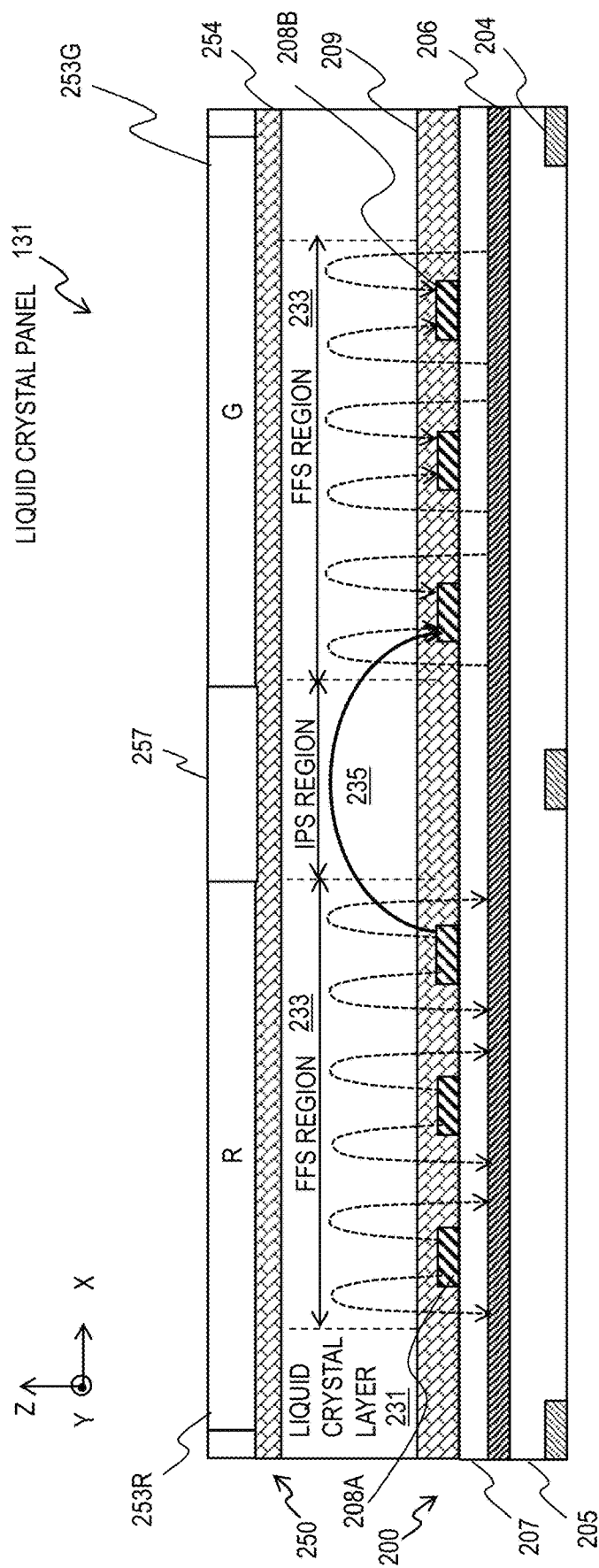
FIG. 12 illustrates a configuration example of a liquid crystal display panel in Embodiment 2.

FIG. 12 illustrates another configuration example of the liquid crystal panel 131. In the configuration example described with reference to FIGS. 2 and 6, the ends of color filters adjacent to each other along the X-axis are in contact with each other. The configuration example in FIG. 12 includes a colorless and transparent region between color filters adjacent to each other. This region increases the brightness of light transmitted through the IPS region 235 when high driving voltage is applied.

In the example in FIG. 12, a colorless transparent region 257 is provided between a red color filter 253R and a green color filter 253G. The colorless transparent region 257 can be made of colorless transparent photoresist. The example in FIG. 12 also includes colorless transparent regions between a green color filter 253G and a blue color filter 253B and between a red color filter 253R and a blue color filter 253B.

The colorless transparent region 257 in the configuration example in FIG. 12 is provided between the pixel electrodes 208A and 208B not to overlap either of them when viewed planarly (along the Z-axis). The width of the colorless transparent region 257 is equal to the width of the IPS region 235. The width and the location of the colorless transparent region 257 can be selected as desirable and are not limited to those in the configuration example in FIG. 12. The colorless transparent region 257 can partially overlap the IPS region 235 when viewed planarly.

In the configuration example in FIG. 12, the second region of the opposite substrate 250 opposed to the first region of the TFT substrate 200 between two adjacent pixel electrodes 208A and 208B includes a colorless transparent region and the color filters (parts thereof) on both sides thereof, as described above.

Figure 13:
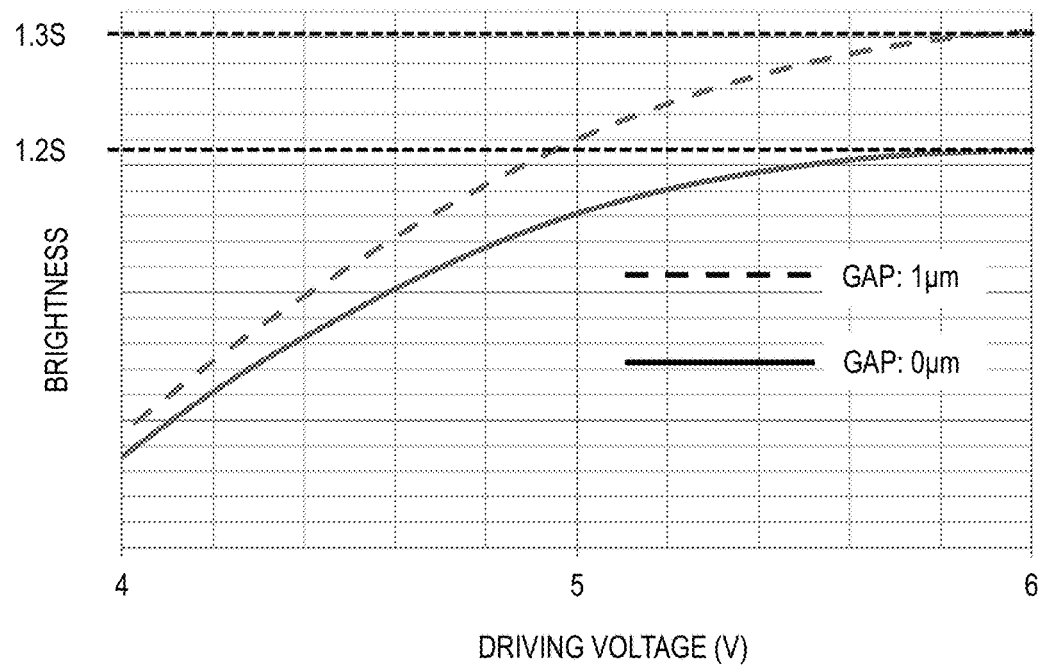
FIG. 13 provides simulation results about the relation between the driving voltage and the brightness of a subpixel of a configuration example in which the gap between color filters (the width of a colorless transparent region) is 1 μm and a configuration example in which the gap between color filters is 0 μm.

FIG. 13 provides simulation results about the relation between the driving voltage and the brightness of a subpixel of a configuration example in which the gap between color filters (the width of a colorless transparent region) is 1 µm and a configuration example in which the gap between color filters is 0 µm. As indicated in the graph of FIG. 13, the brightness in displaying white in the configuration example having a colorless transparent region between color filters is higher than the brightness in displaying white in the configuration example in which color filters are in contact with each other by approximately 10%.

Figure 14:
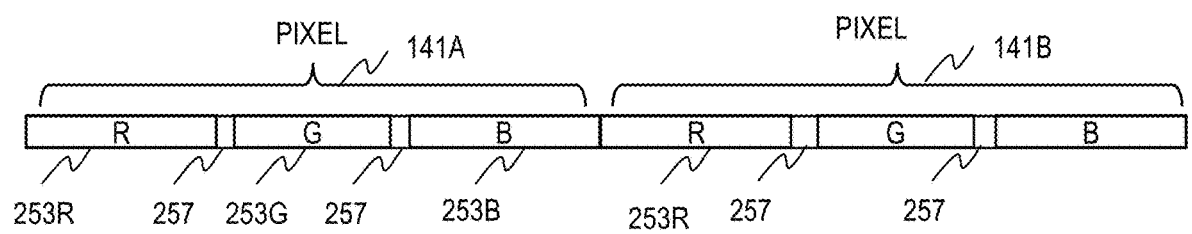
FIG. 14 illustrates an example of the layout of color filters and colorless transparent regions in Embodiment 2.

FIG. 14 illustrates an example of the layout of color filters and colorless transparent regions. In this layout example, colorless transparent regions are provided between color filters of the same pixel and no colorless transparent region is provided between color filters of adjacent pixels so that the color filters of adjacent pixels are in contact with each other. In this layout example, the second region of the opposite substrate 250 opposed to the first region between two adjacent pixel electrodes assigned to one pixel includes a colorless transparent region. However, the second region of the opposite substrate 250 opposed to the first region between two adjacent pixel electrodes assigned to different pixels includes parts of two color filters in contact with each other.

Specifically, a colorless transparent region 257 is provided between the green color filter 253G and the red color filter 253R of the pixel 141A and another colorless transparent region 257 is provided between the green color filter 253G and the blue color filter 253B of the pixel 141A. The same applies to the pixel 141B.

However, there is no colorless transparent region between the blue color filter 253B of the pixel 141A and the red color filter 253R of the pixel 141B and these color filters are in contact with each other. A colorless transparent region can be provided between only either one of the color filter pairs of the same pixel.

The controller 100 (driver circuit 137) can supply a driving voltage higher than the normal voltage on a pixel-by-pixel basis to attain higher brightness than the normal brightness in displaying white. For example, assume that the pixel 141B is supplied with a driving voltage higher than the normal driving voltage to attain brightness higher than the conventional brightness in displaying white. As to the pixel 141A, assume that only the subpixel with the blue color filter 253B is supplied with a driving voltage.

Under the above-described conditions, the IPS region 235 between the pixel electrode under the blue color filter 253B of the pixel 141A and the pixel electrode under the red color filter 253R of the pixel 141B attains high transmittance. If a colorless transparent region is provided between the blue color filter 253B of the pixel 141A and the red color filter 253R of the pixel 141B, the light transmitted through the colorless transparent region mixes with the light transmitted through the blue color filter 253B of the pixel 141A to lower the color purity.

This degradation in color purity can be prevented by laying out the color filters so that adjacent color filters of different pixels are in contact with each other without interposing a colorless transparent region therebetween as described above.

Other Embodiments

Although the foregoing embodiments describe direct-view type of liquid crystal display devices, the features of this disclosure are applicable to projection type of liquid crystal display devices. Eliminating the black matrix and employing transparent data lines in a direct-view type of liquid crystal display device could increase the effect of color mixture when an image is viewed obliquely. Since the projection type of liquid crystal display device displays an image by projecting the image on a projection plane, the effect of color change in the image viewed obliquely can be made small. Further, the elimination of a black matrix or the employment of transparent data lines reduces the absorption of the light from the light source, which effectively prevents the temperature of the projection type of liquid crystal panel from rising.

As described above, the transmittance of the liquid crystal panel 131 can be increased effectively by increasing the angle of bend θ. However, the driving voltage has to be increased together with the angle of bend θ. The driving voltage can be lowered by thickening the interlayer insulating film 207. This is because thickening the interlayer insulating film 207 diminishes the fringe electric field in an FFS region 233 to enhance the electric field between pixel electrodes to be applied to the liquid crystal layer 231. Accordingly, the IPS region 235 attains high transmittance even with low voltage.

As understood from the above, low-voltage driving and high transmittance is attained in a liquid crystal display module with an interlayer insulating film 207 having a thickness in an appropriate range. Thickening the interlayer insulating film 207 reduces the capacitance to be stored in an FFS region 233 and therefore, it is important to determine the thickness of the interlayer insulating film 207 under the condition where the reduction of the capacitance to be stored is tolerable for the design.

Figure 15:
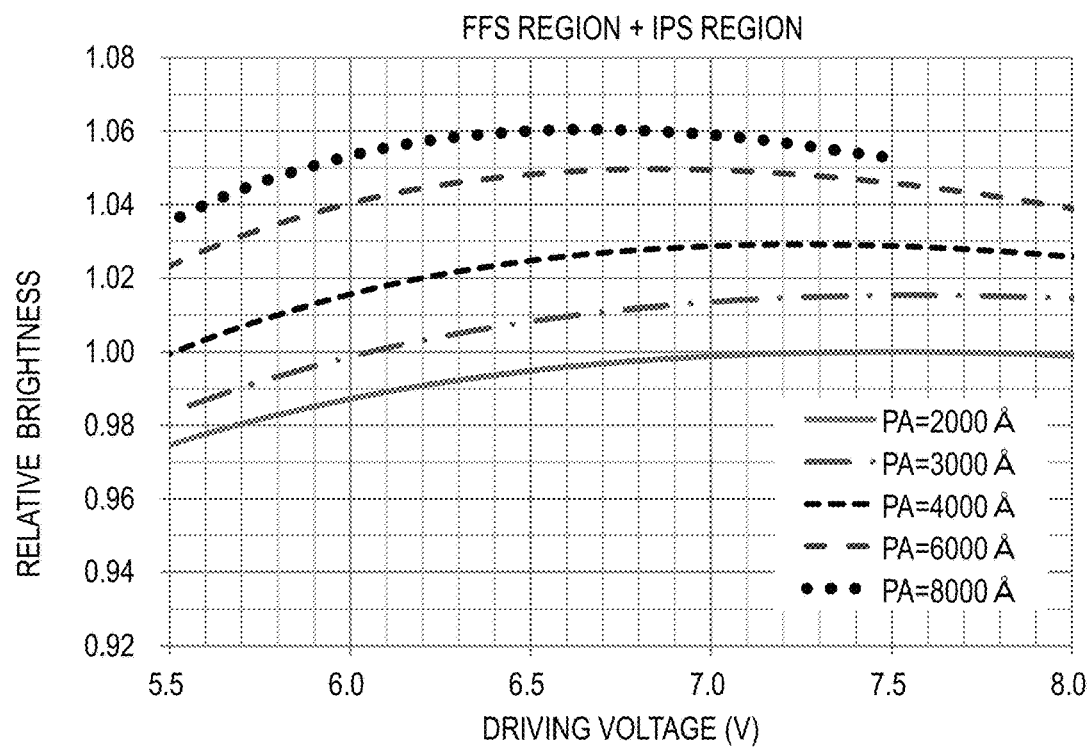
FIG. 15 illustrates relations between the driving voltage and the relative brightness of the light transmitted through an FFS region and an IPS region in the cases where the interlayer insulating film has different thicknesses in another embodiment.
Figure 16:
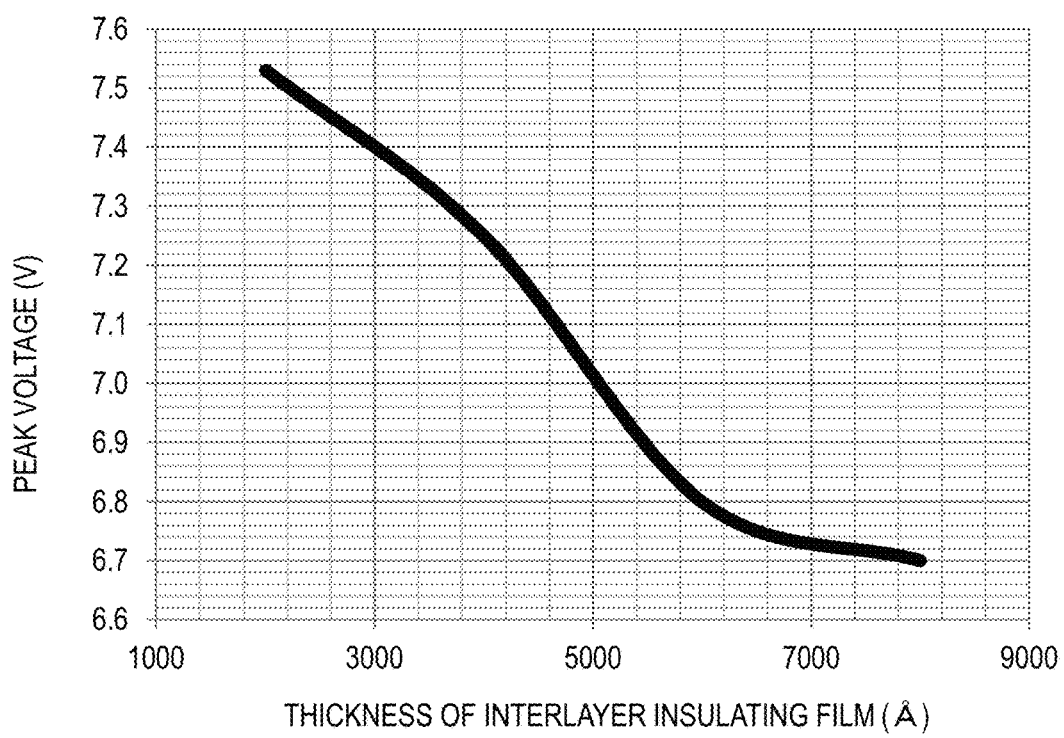
FIG. 16 illustrates a relation between the driving voltage (peak voltage) at the peak brightness and the thickness of the interlayer insulating film in another embodiment.
Figure 17:
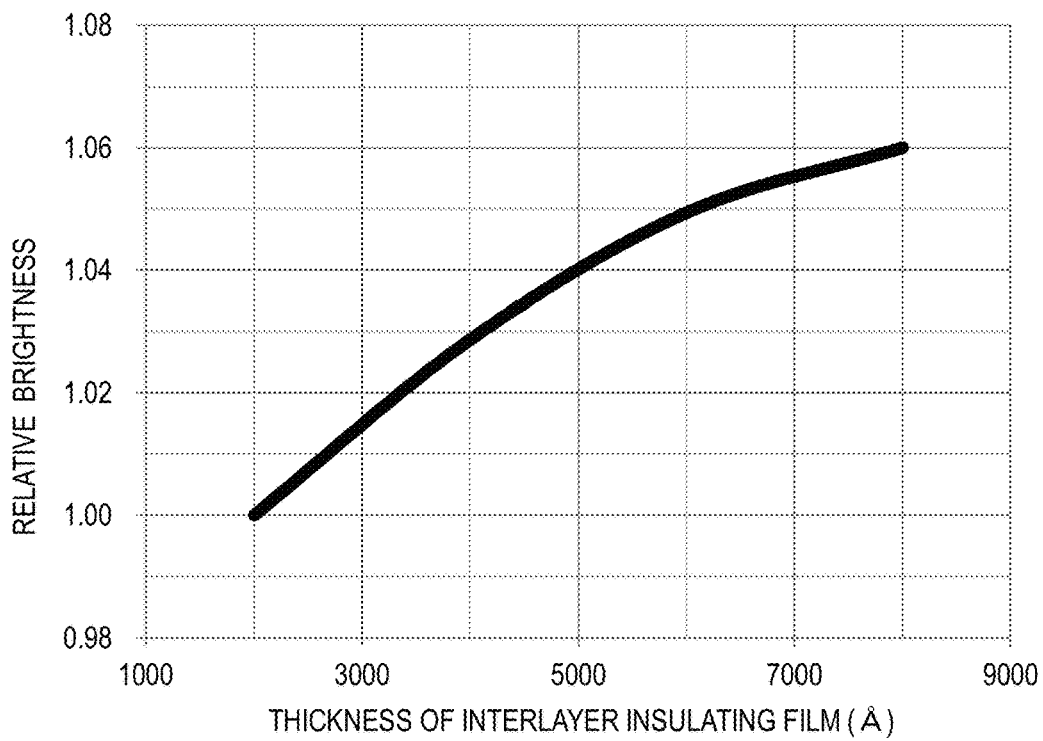
FIG. 17 illustrates a relation between the relative peak brightness and the thickness of the interlayer insulating film in another embodiment.

In the following, simulation results using the configuration example illustrated in FIG. 2 are described. The simulations were conducted under the conditions that the angle of bend θ is the same 20° but the interlayer insulating film 207 has different thicknesses from 2000 Å to 8000 Å. FIG. 15 illustrates relations between the driving voltage and the relative brightness of the light transmitted through an FFS region 233 and an IPS region 235 in the cases where the interlayer insulating film 207 has different thicknesses. FIG. 16 illustrates a relation between the driving voltage (peak voltage) at the peak brightness and the thickness of the inter-layer insulating film 207. FIG. 17 illustrates a relation between the relative peak brightness and the thickness of the interlayer insulating film 207. As indicated in FIGS. 15, 16, and 17, the peak brightness increases and the driving voltage (peak voltage) for attaining the peak brightness falls as the interlayer insulating film 207 becomes thicker.

In the following, a liquid crystal module including a liquid crystal layer 231 of a positive type of liquid crystal material is described. When the fringe electric field in an FFS region 233 becomes higher, the component in the direction perpendicular to the TFT substrate 200 also becomes higher; accordingly, in a liquid crystal display module including a liquid crystal layer 231 of positive type of liquid crystal material, the liquid crystal molecules rotate largely in the vertical direction in addition to the horizontal direction. As a result, the effective retardation decreases to lower the transmittance.

In the case where the liquid crystal layer 231 is made of a negative type of liquid crystal material, the transmittance of the liquid crystal panel can be increased by adjusting the angle of bend θ, as described above. However, increasing the angle of bend θ does not diminish the fringe electric field. To diminish the fringe electric field, thickening the interlayer insulating film 207 is one of the means.

Figure 18:
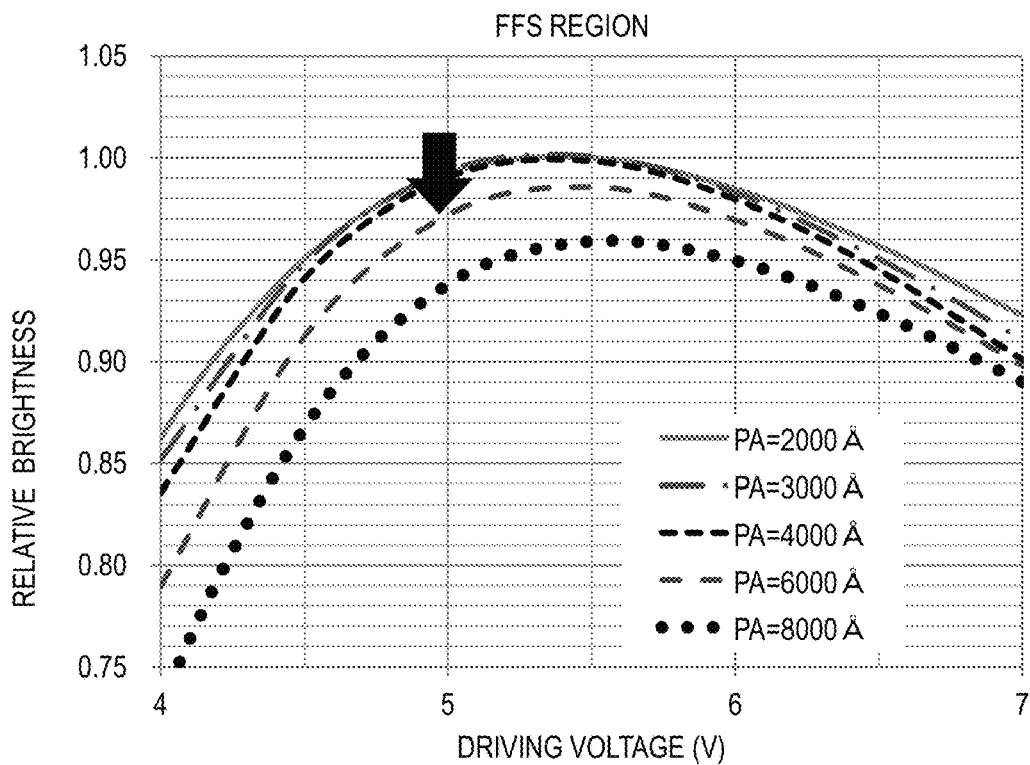
FIG. 18 illustrates relations between the driving voltage and the relative brightness of the light transmitted through an FFS region in the cases where the interlayer insulating film has different thicknesses in still another embodiment.
Figure 19:
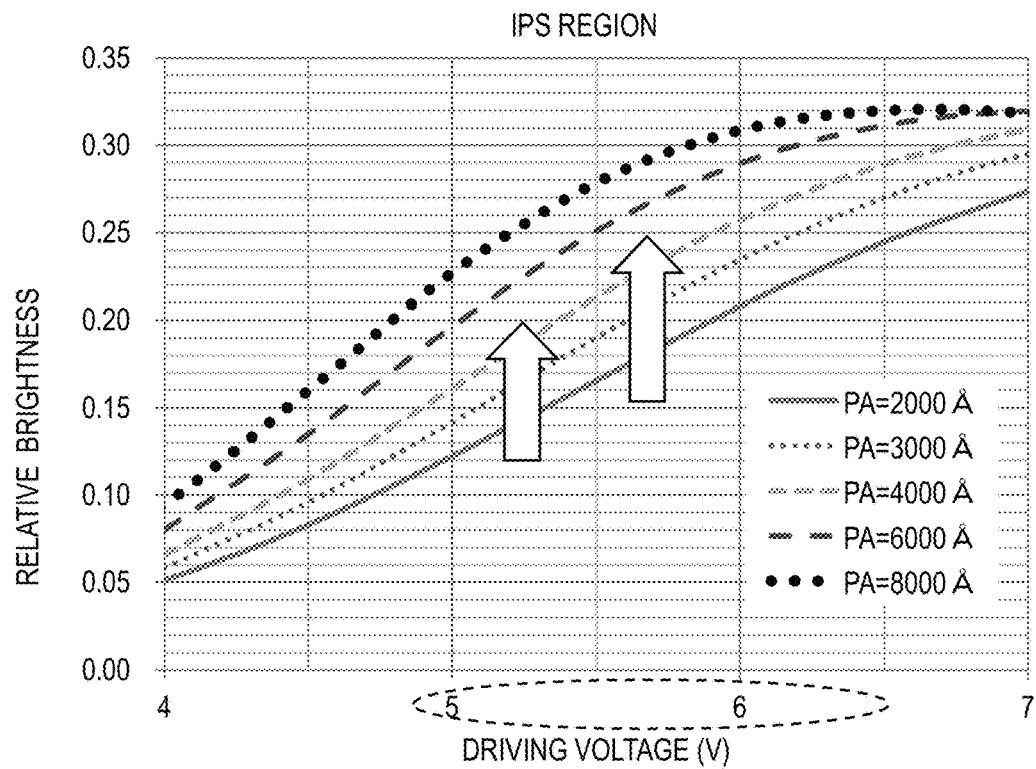
FIG. 19 illustrates relations between the driving voltage and the relative brightness of the light transmitted through an IPS region in the cases where the interlayer insulating film has different thicknesses in still another embodiment.
Figure 20:
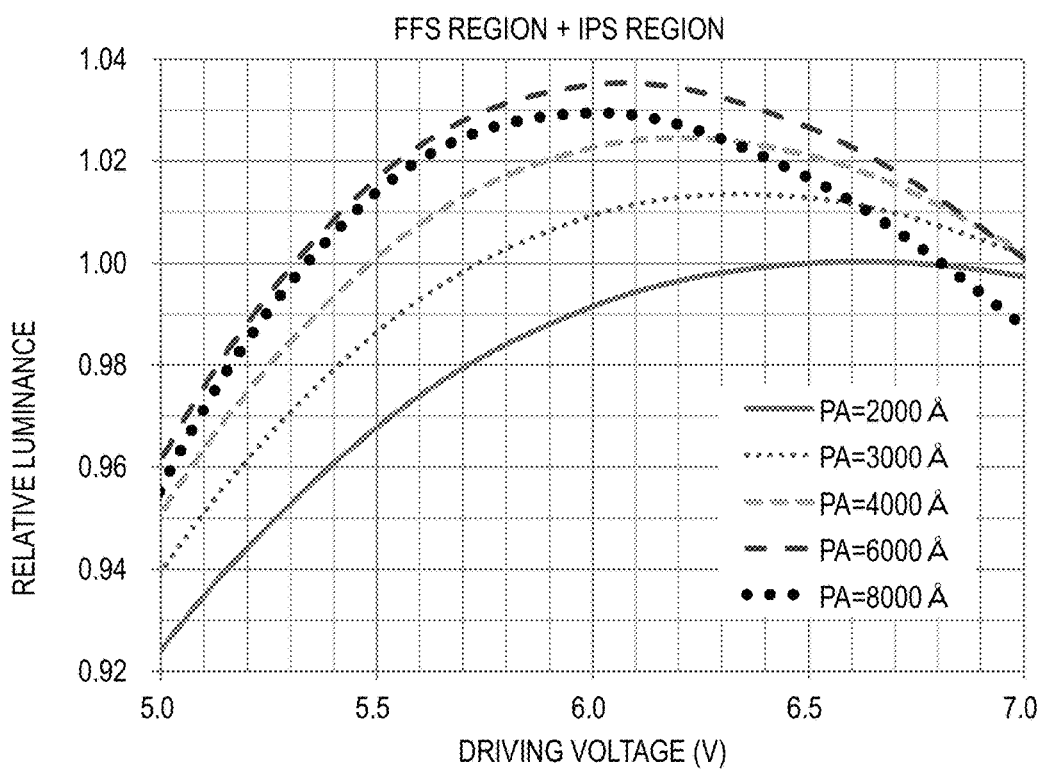
FIG. 20 illustrates relations between the driving voltage and the relative brightness of the light transmitted through an FFS region and an IPS region in the cases where the interlayer insulating film has different thicknesses in still another embodiment.

FIGS. 18, 19, and 20 provide results of simulations using the configuration example illustrated in FIG. 2. The simulations were conducted under the conditions that the angle of bend θ is the same 7° but the interlayer insulating film 207 has different thicknesses from 2000 Å to 8000 Å. FIG. 18 illustrates relations between the driving voltage and the relative brightness of the light transmitted through an FFS region 233 in the cases where the interlayer insulating film 207 has different thicknesses. As indicated in the graph of FIG. 18, the brightness falls as the interlayer insulating film 207 becomes thicker; the driving voltage for attaining desired brightness increases. This indicates that the fringe electric field in the FFS region becomes lower.

FIG. 19 illustrates relations between the driving voltage and the relative brightness of the light transmitted through an IPS region 235 in the cases where the interlayer insulating film 207 has different thicknesses. As indicated in the graph of FIG. 19, the brightness increases as the interlayer insulating film 207 becomes thicker; the driving voltage for attaining desired brightness is lowered. This effect is strong particularly at the voltage higher than 5 V.

FIG. 20 illustrates relations between the driving voltage and the relative brightness of the light transmitted through an FFS region 233 and an IPS region 235 in the cases where the interlayer insulating film 207 has different thicknesses. As indicated in the graph of FIG. 20, the brightness increases as the interlayer insulating film 207 becomes thicker; the driving voltage for attaining desired brightness is lowered. This means that the effect of improving the characteristic of the IPS region 235 is greater than the effect of degrading the characteristic of the FFS region 233.

As described above, in a liquid crystal display module including a positive type of liquid crystal, the transmittance (brightness) of the liquid crystal display module can be increased by determining the thickness of the interlayer insulating film 207 to be in an appropriate range.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A liquid crystal display device comprising:
   a liquid crystal panel; and
   a driver circuit,
   wherein the liquid crystal panel includes:
      an element substrate;
      an opposite substrate; and
      a liquid crystal layer of a negative type of liquid crystal material sandwiched between the element substrate and the opposite substrate,
   wherein the element substrate includes:
      a first insulative substrate;
      an alignment film on the first insulative substrate;
      a common electrode on the first insulative substrate;
      a plurality of pixel electrodes between the common electrode and the alignment film on the first insulative substrate; and
      an interlayer insulating film between the plurality of pixel electrodes and the common electrode,
   wherein the opposite substrate includes:
      a second insulative substrate; and
      color filters on the second insulative substrate, each of the color filters facing one of the plurality of pixel electrodes,
   wherein the driver circuit is configured to supply pixel electrodes adjacent to each other along a first axis with pixel potentials having opposite polarities with respect to a potential of the common electrode,
   wherein each of the plurality of pixel electrodes includes a plurality of straight parts,
   wherein electric fields between the plurality of straight parts and the common electrode are applied to the negative type of liquid crystal material,
   wherein an electric field between a straight part of one of the pixel electrodes adjacent to each other and a straight part of the other one of the pixel electrodes adjacent to each other is applied to the negative type of liquid crystal material,
   wherein the opposite substrate includes a second region opposed to a first region between the straight parts of the pixel electrodes adjacent to each other,
   wherein light in at least a part of a wavelength range of visible light transmitted through the first region is transmitted through the second region,
   wherein angles of the plurality of straight parts of each of the plurality of pixel electrodes with respect to an axis perpendicular to direction of initial alignment of the liquid crystal layer defined by the alignment film have equal sizes, and
   wherein the angles have a size of not less than 15° and not more than 30°.

2. The liquid crystal display device according to claim 1, wherein the second region includes parts of color filters that face the pixel electrodes adjacent to each other and are in contact with each other.

3. The liquid crystal display device according to claim 1, wherein the second region includes a colorless transparent region.

4. The liquid crystal display device according to claim 1, wherein the second region includes a colorless transparent region between color filters facing the pixel electrodes adjacent to each other and parts of the color filters.

5. The liquid crystal display device according to claim 1,
   wherein the liquid crystal panel includes a plurality of pixels,
   wherein each of the plurality of pixels is composed of a plurality of subpixels,
   wherein each of the plurality of pixel electrodes is assigned to a subpixel,
   wherein at least one of the second regions included in each of the plurality of pixels includes a colorless transparent region, and
   wherein the second region opposed to the first region between pixel electrodes that are assigned to different pixels and are adjacent to each other includes parts of color filters in contact with each other.

6. The liquid crystal display device according to any one of claim 1, wherein the common electrode and the plurality of pixel electrodes are colorless and transparent.

7. The liquid crystal display device according to any one of claim 1, wherein a colorless and transparent data line extends in the first region.

8. The liquid crystal display device according to any one of claim 1, further comprising:
   a controller, wherein the controller is configured to supply normal pixel potentials to the pixel electrodes of a pixel to display white in a normal mode, and wherein the controller is configured to supply pixel potentials higher than the normal pixel potentials to the pixel electrodes of a pixel to display white in a high-brightness mode.

* * * * *